US012576545B2

(12) United States Patent
Amemiya

(10) Patent No.: US 12,576,545 B2
(45) Date of Patent: Mar. 17, 2026

(54) ROBOT AND MANUFACTURING METHOD THEREFOR

(71) Applicant: FANUC CORPORATION, Yamanashi (JP)

(72) Inventor: Wataru Amemiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/839,803

(22) PCT Filed: Mar. 29, 2022

(86) PCT No.: PCT/JP2022/015573
§ 371 (c)(1),
(2) Date: Aug. 20, 2024

(87) PCT Pub. No.: WO2023/188011
PCT Pub. Date: Oct. 5, 2023

(65) Prior Publication Data
US 2025/0162180 A1      May 22, 2025

(51) Int. Cl.
B25J 19/00      (2006.01)
B25J 9/00      (2006.01)

(52) U.S. Cl.
CPC ......... B25J 19/0041 (2013.01); B25J 9/0009 (2013.01)

(58) Field of Classification Search
CPC ............................ B25J 9/0009; B25J 19/0041
See application file for complete search history.

(56) References Cited

U.S. PATENT DOCUMENTS

| | | | | |
|---|---|---|---|---|
| 11,312,010 | B2 * | 4/2022 | Fujioka ................ | B25J 19/0029 |
| 2004/0261563 | A1 * | 12/2004 | Inoue ................... | B25J 19/0025 |
| | | | | 74/490.03 |
| 2011/0154933 | A1 * | 6/2011 | Liu ...................... | B25J 19/0029 |
| | | | | 74/490.02 |

FOREIGN PATENT DOCUMENTS

| | | | | | |
|---|---|---|---|---|---|
| CN | 110815176 | A | * | 2/2020 | .............. B25J 19/00 |
| EP | 0502832 | A1 | * | 9/1992 | ........... B25J 9/1025 |
| JP | 10-34588 | | * | 2/1988 | |
| JP | 63-295195 | | * | 12/1988 | |
| JP | H07124886 | A | | 5/1995 | |
| JP | 2005014159 | A | | 1/2005 | |
| JP | 4305390 | B2 | * | 7/2009 | .............. B25J 17/00 |
| JP | 2009220221 | A | | 10/2009 | |
| JP | 2015015436 | A | | 1/2015 | |
| JP | 2019063935 | A | | 4/2019 | |
| JP | 2021003787 | A | | 1/2021 | |

* cited by examiner

*Primary Examiner* — William C Joyce
(74) *Attorney, Agent, or Firm* — Maier & Maier, PLLC

(57) ABSTRACT

A robot includes a first member that defines a first internal space accessible from the outside via an opening, a second member linked to the first member to rotate around a prescribed axis, a third member removably attached to the second member and defines a second internal space between the second and third members, a wire body routed through a passage that allows the first internal space and the second internal space to communicate at a position including the axis, and has one end fixed to the third member, a first fixing member that fixes a midway position of the wire body in the length direction to the third member on one side of the passage, and a second fixing member that fixes a midway position of the wire body in the length direction to the first member on the other side of the passage.

9 Claims, 9 Drawing Sheets

ROBOT AND MANUFACTURING METHOD THEREFOR

TECHNICAL FIELD

The present disclosure relates to a robot and a manufacturing method therefor.

BACKGROUND

A known robot in the related art includes a hollow first member, a hollow second member, and a hollow actuator that rotationally drives the second member about a rotation axis with respect to the first member (for example, see Japanese Unexamined Patent Application, Publication No. 2021-3787). In this robot, a wire body is routed between the first member and the second member through a center hole in the actuator. The wire body is fixed, at an intermediate position in the longitudinal direction thereof, to a fixing member fixed to an input shaft member of a reducer in the internal space of the first member, and is fixed to a fixing member fixed to an output shaft member of the reducer in the internal space of the second member.

SUMMARY

One aspect of the present disclosure is a robot comprising: a first member that defines a first internal space accessible from an outside via an opening; a second member connected to the first member so as to be relatively rotatable about a predetermined axis; a third member detachably attached to the second member to define a second internal space between the second member and the third member; a wire body that is routed through a passage communicating between the first internal space and the second internal space at a position including the axis, the wire body being connected at one end thereof to a component fixed to the third member; a first fixing member with which an intermediate position of the wire body in a lengthwise direction is fixed to the third member on one side of the passage; and a second fixing member with which an intermediate position of the wire body in the lengthwise direction is fixed to the first member on an other side of the passage. The wire body between the first fixing member and the second fixing member is disposed with slack required for relative rotation between the first member and the second member.

DETAILED DESCRIPTION OF EMBODIMENTS

A robot 1 and a manufacturing method therefor according to an embodiment of the present disclosure will be described below with reference to the drawings.

Figure 1:
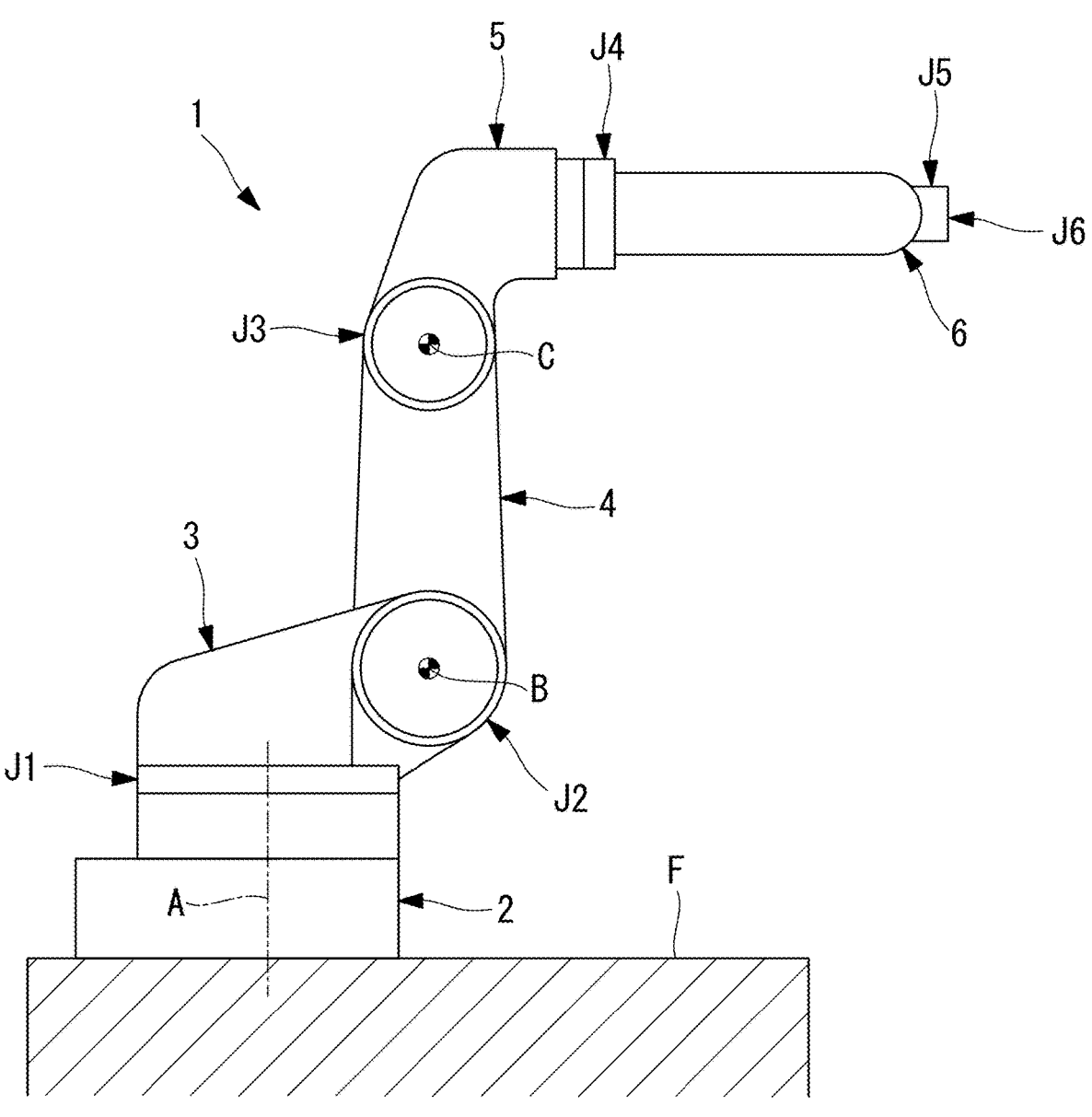
FIG. 1 is a side view showing a robot according to an embodiment of the present disclosure.

As shown in FIG. 1, for example, the robot 1 according to this embodiment is a vertical six-axis articulated robot and includes a base 2 installed on a floor F and a revolving drum 3 supported so as to be rotatable about a vertical axis A with respect to the base 2.

The robot 1 includes a first arm 4 supported so as to be rotatable about a horizontal axis B with respect to the revolving drum 3, and a second arm 5 supported so as to be rotatable about a horizontal first axis C with respect to the first arm 4. The robot 1 further includes a three-axis wrist unit 6 at the distal end of the second arm 5.

The robot 1 according to this embodiment includes a first joint J1 that rotationally drives the revolving drum 3 with respect to the base 2, a second joint J2 that rotationally drives the first arm 4 with respect to the revolving drum 3, a third joint J3 that rotationally drives the second arm 5 with respect to the first arm 4, and fourth to sixth joints J4 to J6 of the wrist unit 6. The robot 1 includes the following structure in at least one of the six joints J1, J2, J3, J4, J5, and J6 described above.

Figure 2:
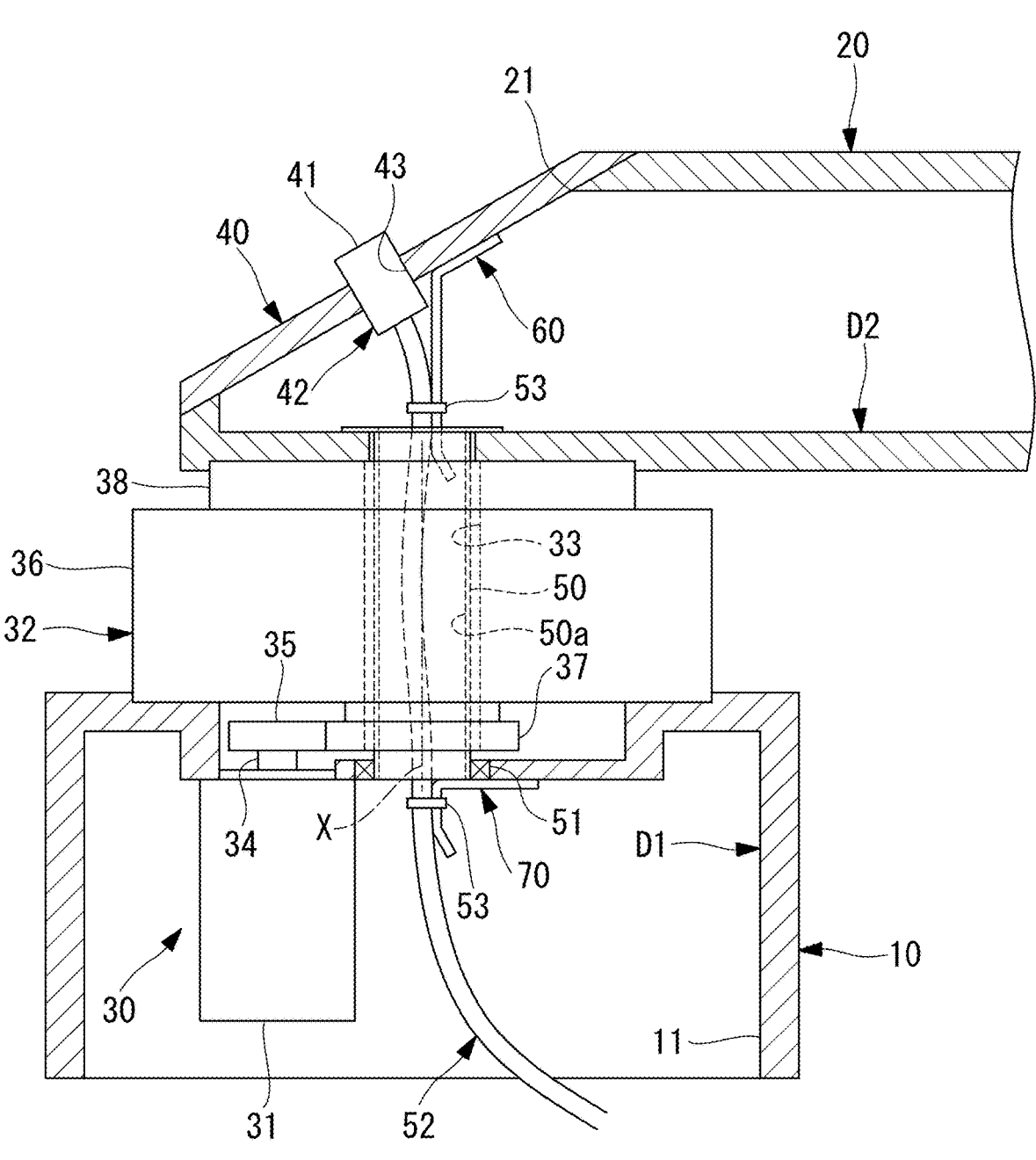
FIG. 2 is a partial vertical sectional view showing an assembled state of any of joints of the robot in FIG. 1.

Here, any of the joints J1, J2, J3, J4, J5, and J6 that rotationally drive a second member 20 with respect to a first member 10, will be described as an example. As shown in FIG. 2, the robot 1 includes the first member 10, the second member 20, and an actuator 30 that rotationally drives the first member 10 and the second member 20 about a predetermined rotation axis (axis) X relative to each other.

The first member 10 is a hollow member having an internal space (first internal space) D1. The second member 20 is also a hollow member having an internal space (second internal space) D2. The first member 10 and the second member 20 have openings 11 and 21, respectively, which allow access to the interior of the internal spaces D1 and D2 from the outside. The third member 40 is detachably attached to the opening 21 in the second member 20. The internal space D2 is closed by attaching the third member 40 to the opening 21 in the second member 20.

The actuator 30 includes a motor 31 accommodated in the internal space D1 of the first member 10 and a reducer 32 attached between the first member 10 and the second member 20. The reducer 32 is a hollow reducer having a center hole (hollow hole) 33 and is disposed such that the center of the center hole 33 coincides with the rotation axis X of the first member 10 and the second member 20.

The motor 31 is disposed offset with respect to the reducer 32 and transmits power to the reducer 32 by means of a gear 35 provided at an end of a shaft 34 of the motor 31. The reducer 32 includes a case 36 fixed to the first member 10, an input shaft member 37 that meshes with the gear 35, and an output shaft member 38 fixed to the second member 20, reduces the rotational speed of the shaft 34 of the motor 31, and rotates the output shaft member 38 about the rotation axis X with respect to the case 36.

Because the motor 31 is disposed offset with respect to the reducer 32, the center hole 33 in the reducer 32 is open to the internal space D1 of the first member 10 at one end thereof and is open to the internal space D2 of the second member 20 at the other end thereof without being blocked by the motor 31. A cylindrical member 50 made of, for example, resin is inserted into the center hole 33.

One end of the cylindrical member 50 is fixed to the second member 20 in a sealed state, and the other end is rotatably sealed by a seal member 51 disposed between the cylindrical member 50 and the first member 10. With this structure, a space to be filled with lubricant, including the reducer 32 and the gear 35, is sealed, and the internal space D1 of the first member 10 and the internal space D2 of the second member 20 communicate with each other through a passage 50a constituted by the inner hole of the cylindrical member 50 disposed in the center hole 33 in the reducer 32.

The robot 1 according to this embodiment includes a wire body 52 routed from the internal space D1 of the first member 10 to the internal space D2 of the second member 20 via the passage 50a in the center hole 33 in the reducer 32. A connector (component) 42, which penetrates through the third member 40 in the thickness direction to dispose a connecting portion 41 on the outside, is fixed to the third member 40. One end of the wire body 52 passing through the passage 50a is connected to the connector (component) 42 of the third member 40, and thus is fixed to the third member 40.

Furthermore, the robot 1 includes a metal plate (first fixing member) 60 with which an intermediate position of the wire body 52 in the lengthwise direction is fixed to the third member 40 in the internal space D2 of the second member 20, which is on one side of the passage 50a. The robot 1 also includes a metal plate (second fixing member) 70 with which another intermediate position of the wire body 52 in the lengthwise direction is fixed to the first member 10 in the internal space D1 of the first member 10, which is on the other side of the passage 50a.

The wire body 52 is fixed to each of the metal plates 60 and 70 with, for example, fastening cable ties 53. In this way, the wire body 52 between the two metal plates, 60 and 70, is disposed in the passage 50a with minimum slack required for relative rotation between the first member 10 and the second member 20. By disposing the wire body 52 in the passage 50a, including the rotation axis X, with minimum required slack, even when the second member 20 rotates with respect to the first member 10, the wire body 52 is not subjected to an excessive load, and the wire body 52 is not excessively slack even in the most loosened state.

Next, a method for manufacturing the thus-configured robot 1 according to this embodiment will be described below. In the method for manufacturing the robot 1 according to this embodiment, the case 36 of the reducer 32 is fixed to the first member 10, the output shaft member 38 of the reducer 32 is fixed to the second member 20, and the motor 31 is assembled at a position offset with respect to the reducer 32, in the internal space D1 of the first member 10.

With this structure, when the shaft 34 of the motor 31 is rotated by the operation of the motor 31, the rotation of the shaft 34 is input to the input shaft member 37 via the gear 35, the input rotation is reduced by the reducer 32, and the output shaft member 38 is rotated about the rotation axis X with respect to the case 36. Because the case 36 is fixed to the first member 10 and the output shaft member 38 is fixed to the second member 20, the second member 20 is relatively rotated about the rotation axis X, relative to the first member 10, at a rotational speed reduced by the reducer 32.

Figure 3:
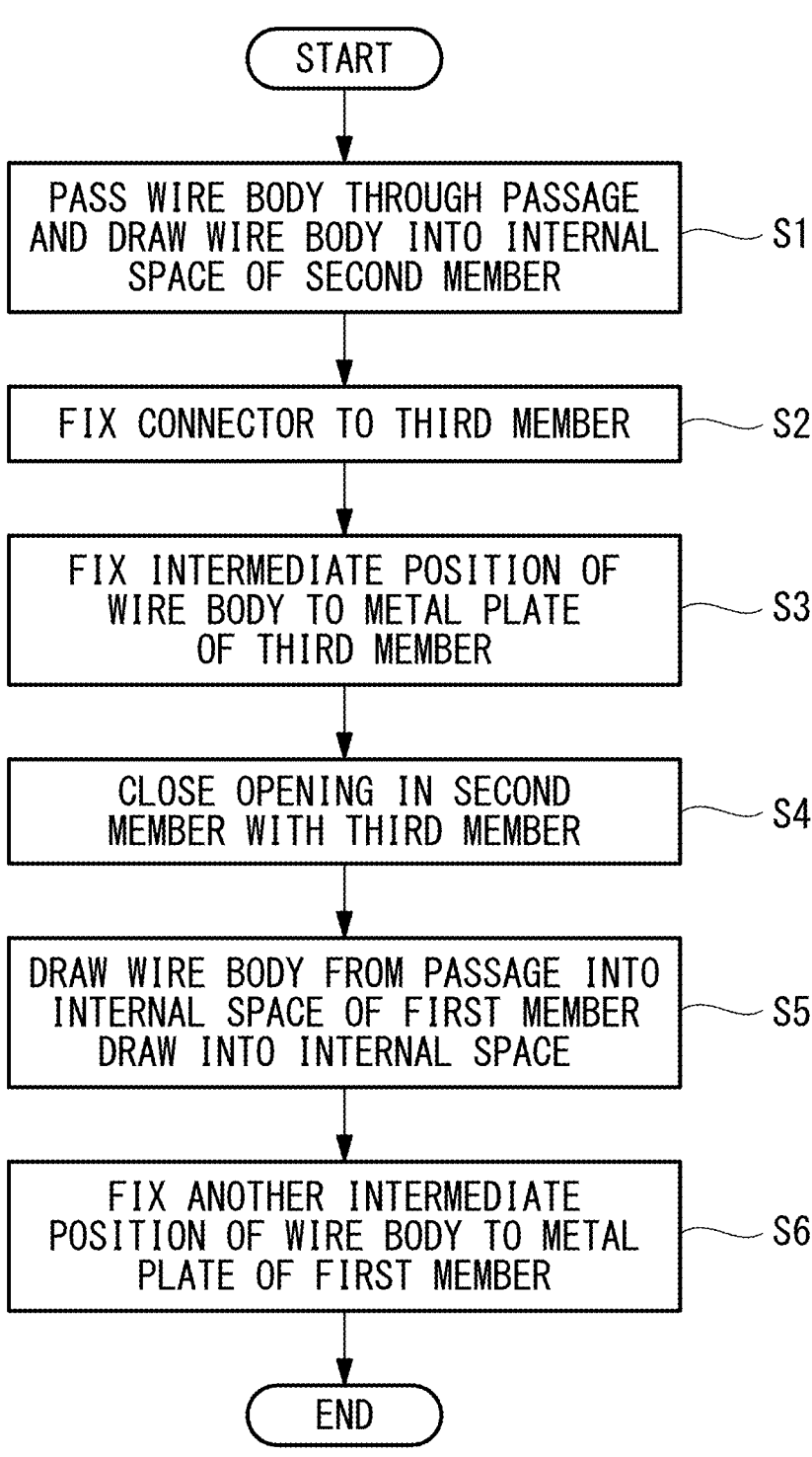
FIG. 3 is a flowchart for explaining a method for manufacturing the robot in FIG. 2.

The wire body 52 is assembled with respect to the thus-configured structure of the robot 1 according to the following procedure, as shown in FIG. 3.

Figure 4:
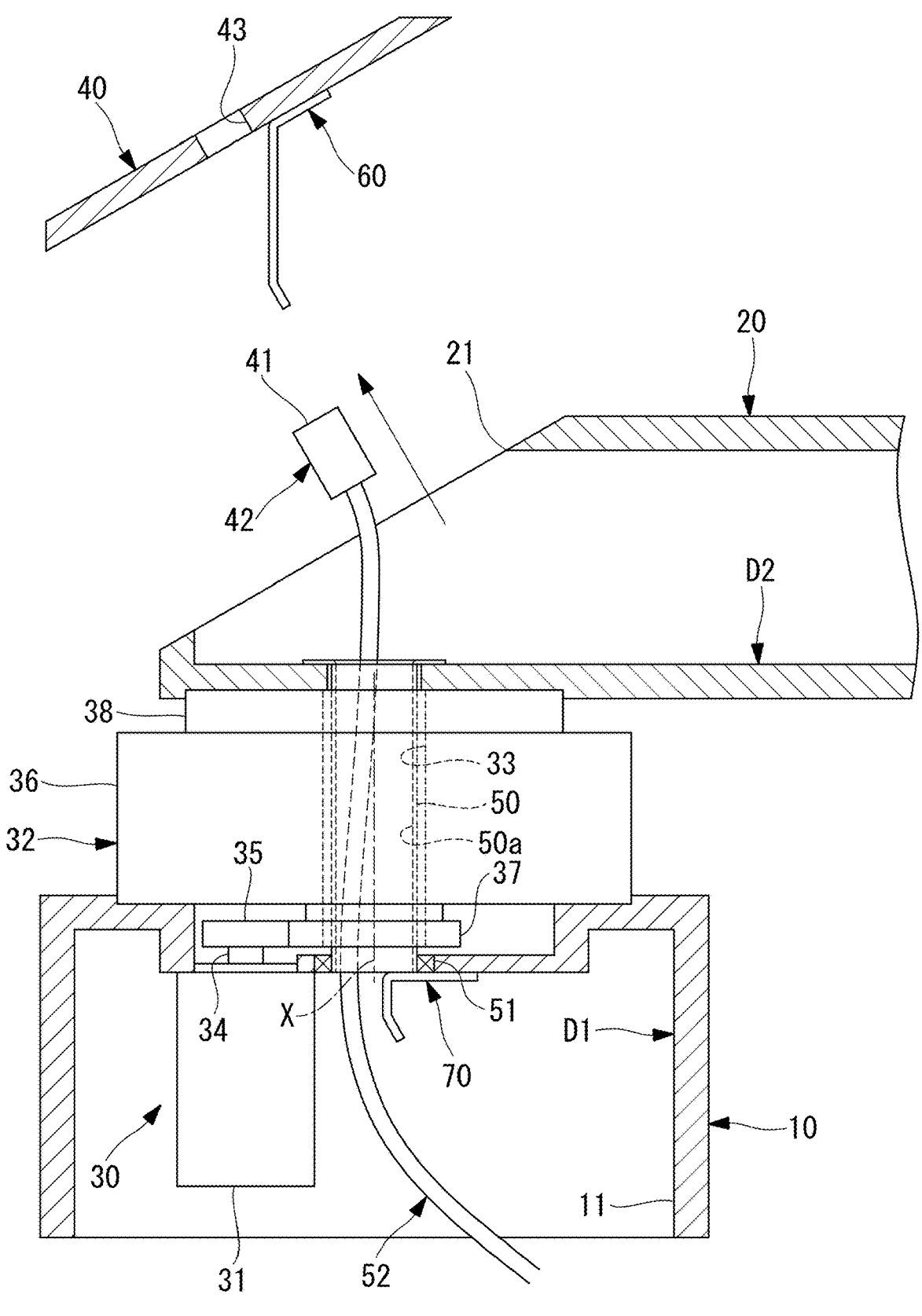
FIG. 4 is a partially exploded vertical sectional view of the robot in FIG. 2, showing a state in which a wire body is drawn from a first member side to a second member side, in a state in which a third member is removed.

First, as shown in FIG. 4, in a state which the third member 40 is removed from the second member 20 to open the opening 21, the wire body 52 is passed from the internal space D1 of the first member 10 through the passage 50a of the center hole 33 in the reducer 32, so that the distal end of the wire body 52 is drawn toward the internal space D2 of the second member 20 (step S1).

Figure 5:
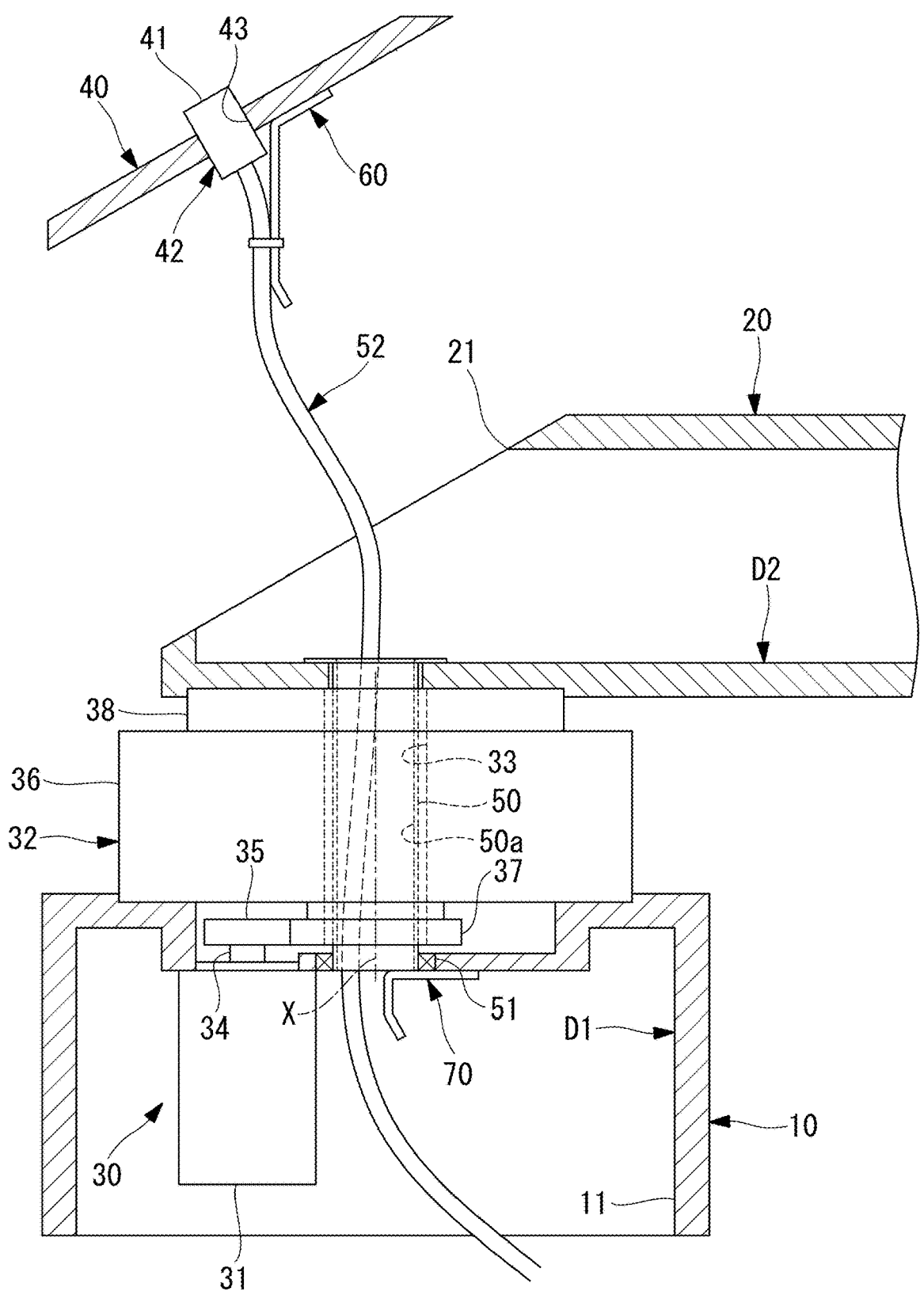
FIG. 5 is an exploded vertical sectional view showing a state in which a distal end of the drawn wire body in FIG. 4 is fixed to the third member.

Then, the distal end of the wire body 52 drawn toward the internal space D2 of the second member 20 is connected to the connector 42 fixed in a state of penetrating through the third member 40 in the thickness direction. Alternatively, as shown in FIG. 5, the connector 42 connected to the distal end of the wire body 52 is fixed in a state of being inserted into a through hole 43 formed so as to penetrate through the third member 40 in the thickness direction (step S2).

In this way, power or an electric signal, in the case where the wire body 52 is a cable, or a pressurized fluid or the like, in the case where the wire body 52 is a tube, can be extracted to the outside of the internal space D2 of the second member 20 through the third member 40 in the thickness direction.

Figure 6:
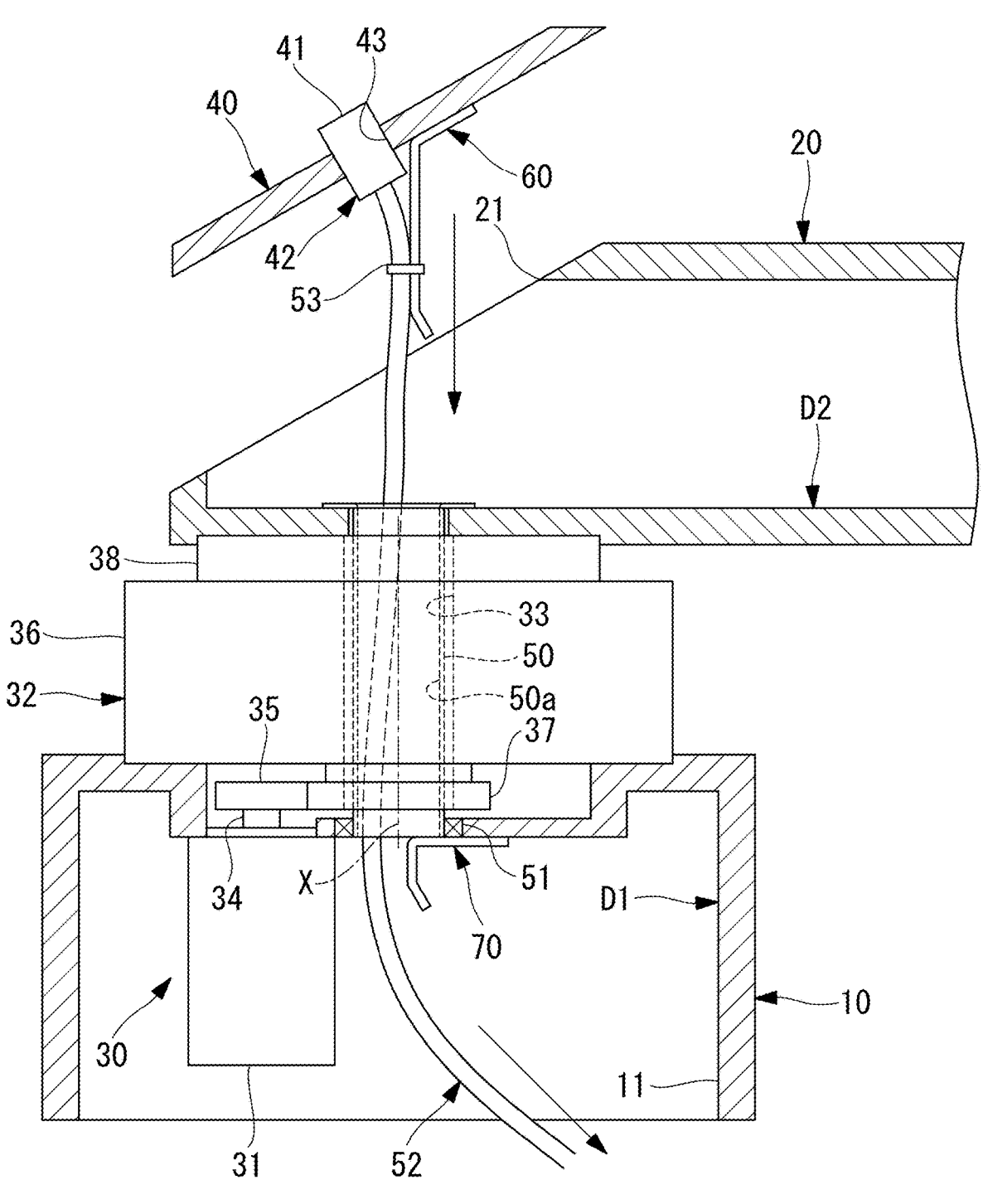
FIG. 6 is an exploded vertical sectional view for explaining a task of closing an opening in the second member with the third member in FIG. 5.

Next, as shown in FIG. 6, an intermediate position of the wire body 52 in the lengthwise direction is fixed, by fastening the cable tie 53, to the metal plate 60 fixed to the third member 40 (step S3). At this time, the fastening position with the cable tie 53 is set such that the wire body 52 between the connector 42 and the metal plate 60 does not have unnecessary slack. In this state, the wire body 52 is fixed to neither the first member 10 nor the second member 20.

Thereafter, as shown in FIG. 2, the third member 40 is disposed at a position where it closes the opening 21 in the second member 20, and is fixed to the second member 20 with a bolt or the like (not shown) (step S4). In this way, the internal space D2 of the second member 20 is closed.

Next, as shown in FIG. 2, in the internal space D1 of the first member 10 accessed from the outside via the opening 11 in the first member 10, the wire body 52 passing through the center hole 33 in the reducer 32 is drawn toward the internal space D1 of the first member 10 (step S5). The end of the wire body 52 needs to be moved by an amount corresponding to the amount by which the third member 40 is displaced to open and close the opening 21 in the second member 20. Hence, by drawing the wire body 52 by that amount toward the internal space D1 of the first member 10, the slack of the wire body 52 in the internal space D2 of the second member 20 can be eliminated. In this way, the length of the wire body 52 extending from the fixing position to the metal plate 60 of the third member 40 through the passage 50a is adjusted to a length having minimum slack required for relative rotation between the first member 10 and the second member 20.

Then, with the adjusted length, an intermediate position of the wire body 52 in the lengthwise direction is fixed, with the cable tie 53, to the metal plate 70 fixed to the first member 10 (step S6). In this way, the wire body 52 between the two metal plates 60 and 70 is disposed in the passage 50a with minimum slack required for relative rotation between the first member 10 and the second member 20.

As described above, with the robot 1 and the manufacturing method therefor according to this embodiment, the wire body 52, which is fixed at one end thereof to the third member 40 that closes the opening 21 in the second member 20, can be routed without slack in the internal space D2 of the second member 20. Hence, there is an advantage in that, even when the first member 10 and the second member 20 are relatively rotated by the operation of the robot 1, it is possible to prevent the wire body 52 from coming into contact with the inner wall of the second member 20 due to the acceleration/deceleration or the vibration thereof, and to maintain the wire body 52 in a sound state.

In order to dispose, in the passage 50*a*, the wire body 52 in the passage 50*a* with minimum slack required for relative rotation between the first member 10 and the second member 20, intermediate positions of the wire body 52 need to be fixed on both sides of the passage 50*a*. If the intermediate position of the wire body 52 is to be fixed to the second member 20 on the side of the passage 50*a* closer to the internal space D2 of the second member 20, the wire body 52 needs to be provided with slack for allowing the third member 40 to open and close the opening 21 in the second member 20. In this case, the internal space D2 of the second member 20 needs to be increased in size to accommodate the slack. In contrast, with the robot 1 according to this embodiment, there is an advantage in that there is no need to provide slack in the wire body 52, making it possible to reduce the size of the second member 20 and make the robot 1 compact.

In this embodiment, an example case where the first member 10 and the second member 20 are coupled to each other by the reducer 32 so as to be rotatable about the rotation axis X has been described. However, the invention is not limited thereto and may be applied to, for example, the case where the first member 10 and the second member 20 are coupled to each other by a bearing 54 so as to be rotatable about the rotation axis X, as shown in FIG. 7.

Figure 7:
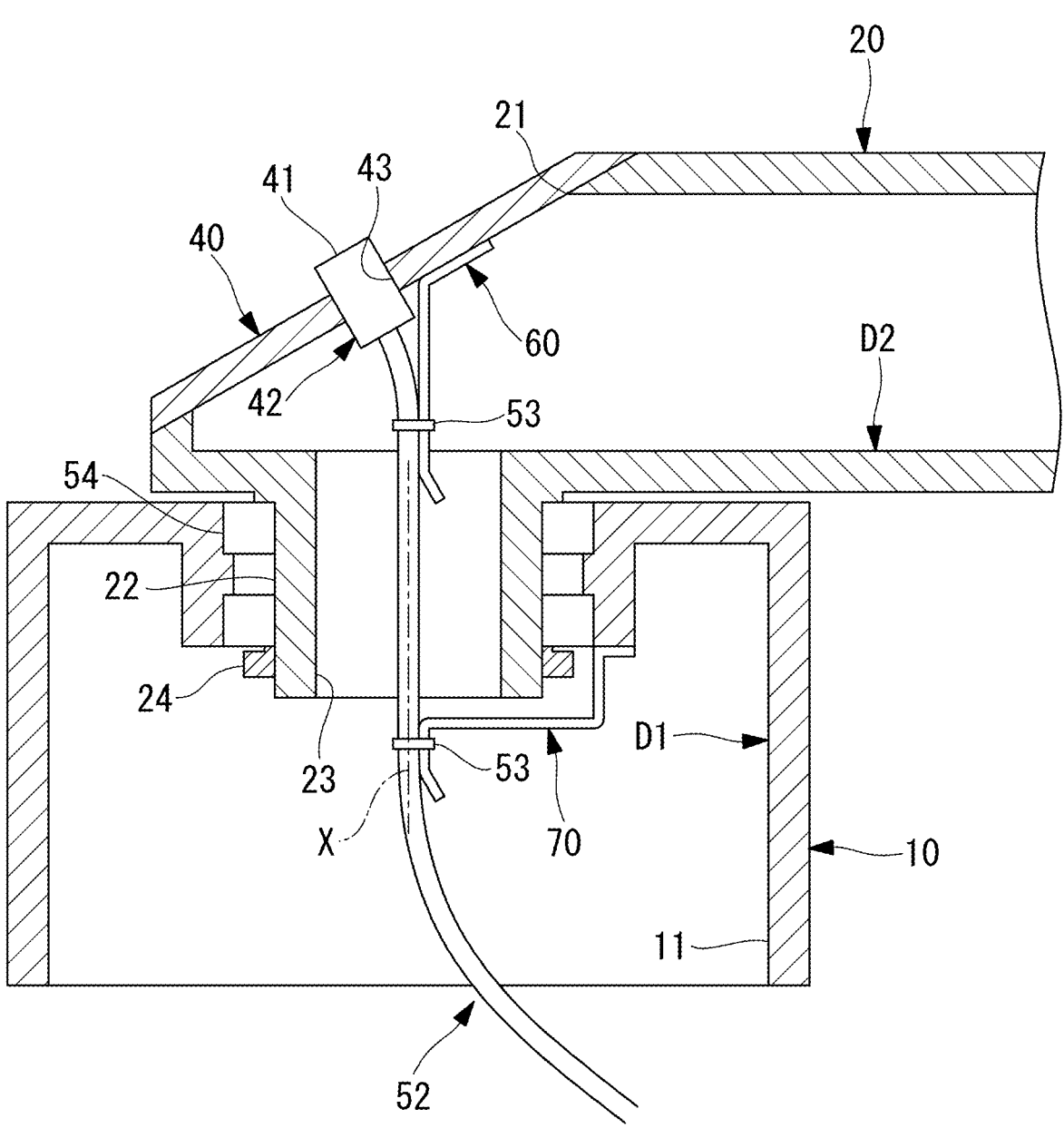
FIG. 7 is a vertical sectional view showing a modification of the robot in FIG. 2.

For example, in the example shown in FIG. 7, the second member 20 has a cylindrical portion 22 extending in a direction along the rotation axis X, an inner ring of the bearing 54 is fixed to the outer surface of the cylindrical portion 22, and an outer ring of the bearing 54 is fixed to the first member 10, so that the first member 10 and the second member 20 are configured to be relatively rotatable about the rotation axis X. In the drawing, reference sign 23 denotes a passage constituted by the inner hole of the cylindrical portion 22. Reference sign 24 denotes a nut 24 for pressing the bearing 54 against the second member 20, and the nut 24 is fastened to a male screw (not shown) formed on the cylindrical portion 22, thereby being fixed to the second member 20.

In this embodiment, although the connector 42 has been described as an example of the component to be fixed to the third member 40, the component is not limited thereto, and another component, such as a switch or a sensor, may be fixed.

Figure 8:
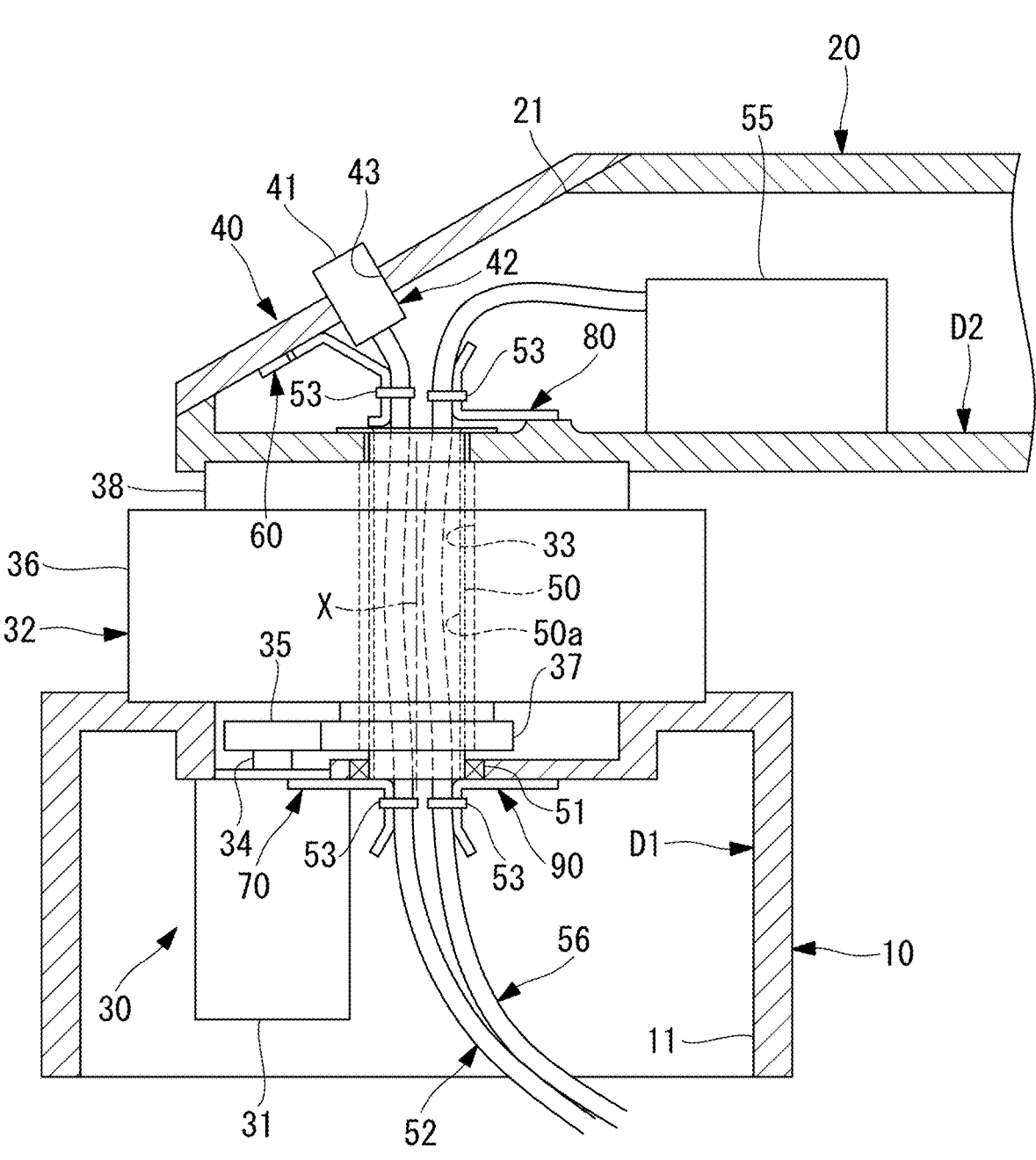
FIG. 8 is a vertical sectional view showing another modification of the robot in FIG. 2.

FIG. 8 shows a case where a component (another component), such as a motor 55, is accommodated in the internal space D2 of the second member 20. A wire body (another wire body) 56, such as a cable, connected to this component may be fixed to metal plates (a third fixing member, a fourth fixing member) 80 and 90 fixed to the first member 10 and the second member 20, respectively, on both sides of the passage 50*a*.

Specifically, the wire body 56, which will not be fixed to the third member 40 at the distal end thereof, can be fixed, with the cable tie 53 or the like, to the metal plate 80 fixed to the second member 20 before the opening 21 is closed by the third member 40. By doing so, the wire body 56 can also be disposed in the passage 50*a* without slack in the second member 20 and with minimum slack required for relative rotation between the first member 10 and the second member 20.

The wire body 56, which will not be fixed to the third member 40 at the distal end thereof, may be fixed, in the internal space D1 of the first member 10, to the first member 10 via the metal plate 80, which is different from the metal plate for the wire body 52 fixed to the third member 40, or may be fixed to the first member 10 with a common metal plate 70. Fixing using the common metal plate 70 can reduce the number of components and can reduce the cost.

The other component in this case may be, instead of the motor 55, any component, such as a sensor, a circuit board, or an electromagnetic valve, that requires wiring or piping.

In this embodiment, although an example case where both the first member 10 and the second member 20 rotatably connected to each other are both hollow members having the internal spaces D1 and D2 has been described, the present invention is not limited thereto.

Figure 9:
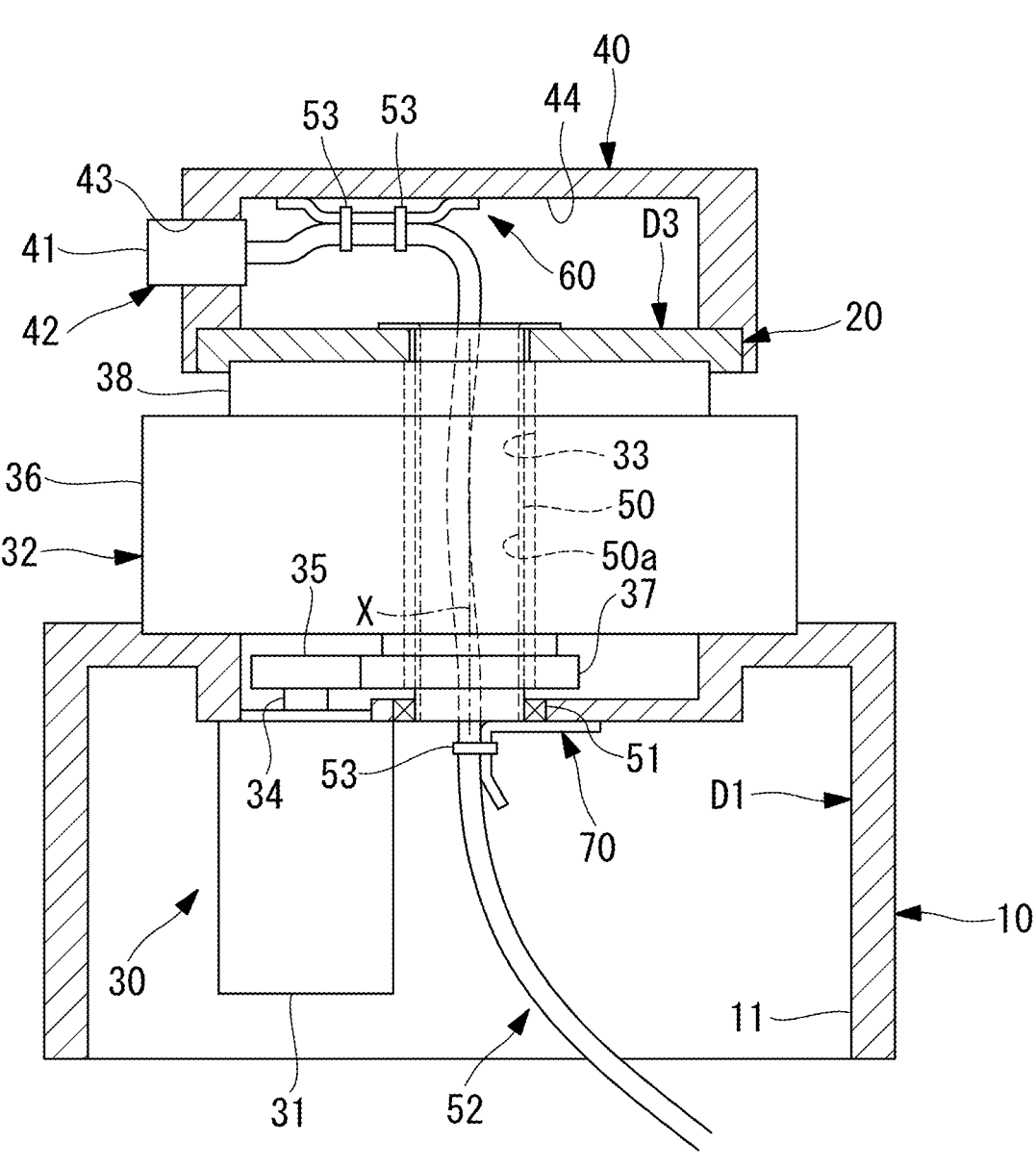
FIG. 9 is a vertical sectional view showing another modification of the robot in FIG. 2.

For example, as shown in FIG. 9, the second member 20 to be rotatably connected to the first member 10 may be formed in a flat plate shape without the internal space D2, and the third member 40 may be a member that has a recess 44 and defines an internal space (second internal space) D3 between the third member 40 and the second member 20 when combined with the second member 20.

Also in this case, after an intermediate position of the wire body 52 in the longitudinal direction is fixed to the metal plate 60 fixed to the inside of the third member 40 with the cable tie 53 or the like, the third member 40 is assembled with respect to the second member 20 to close the internal space D3. Thereafter, in the internal space D1 of the first member 10, another intermediate position of the wire body 52 in the longitudinal direction is fixed, with the cable tie 53 or the like, to the metal plate 70 fixed to the first member 10. In this way, wiring can be performed without producing large slack both in the passage 50*a* and in the internal space D3 defined by the second member 20 and the third member 40.

In this embodiment, although an example case where the metal plates 60 and 70, to which the wire body 52 is fixed on both sides of the passage 50*a*, are disposed on the extension of the passage 50*a* has been described, the metal plates 60 and 70 may be disposed at positions radially away from the extension of the passage 50*a*.

Furthermore, although the cable ties 53 have been described as an example of the fixing members for fixing the wire body 52 to the metal plates 60 and 70, any other fixing member, such as metal plates that sandwich the wire body 52 in the radial direction with a sponge interposed therebetween, may be used.

The invention claimed is:

1. A robot comprising:

a first member that defines a first internal space accessible from an outside via an opening;

a second member connected to the first member so as to be rotatable about a predetermined axis;

a third member detachably attached to the second member to define a second internal space between the second member and the third member;

a wire body that is routed through a passage communicating between the first internal space and the second internal space at a position including the axis, the wire body being connected at one end thereof to a component fixed to the third member;

a first fixing member directly fixed to the third member, by which an intermediate position of the wire body in a lengthwise direction is fixed to the third member on one side of the passage, the intermediate position being directly fixed to the first fixing member; and a second fixing member with which an intermediate position of the wire body in the lengthwise direction is fixed to the first member on an other side of the passage, wherein the wire body between the first fixing member and the second fixing member is disposed with slack required for relative rotation between the first member and the second member, and wherein the wire body in the second internal space of the second member is routed without slack.

2. The robot according to claim 1, wherein the wire body between the first fixing member and the second fixing member is disposed with minimum slack required for relative rotation between the first member and the second member.

3. The robot according to claim 1, further comprising:

a motor accommodated in the first internal space; and a reducer that reduces rotation of a shaft of the motor and transmits the rotation to the second member, wherein the reducer has a hollow hole penetrating along the axis, and the passage is provided in the hollow hole.

4. The robot according to claim 1, further comprising:

another wire body that passes through the passage and is connected to another component fixed to the second member in the second internal space; and a third fixing member and a fourth fixing member with which intermediate positions of the other wire body in the lengthwise direction are fixed to the second member on one side of the passage and to the first member on the other side of the passage, respectively, wherein the other wire body between the third fixing member and the fourth fixing member is disposed with slack required for relative rotation between the first member and the second member.

5. The robot according to claim 4, wherein the second fixing member and the fourth fixing member are a common fixing member.

6. The robot according to claim 1, wherein the component is a connector fixed in a state of penetrating through the third member in a thickness direction thereof.

7. The robot according to claim 1, wherein the wire body extending from the first fixing member through the passage is configured to be adjusted in length to provide the minimum slack required for relative rotation between the first member and the second member.

8. The robot according to claim 7, wherein a length of the wire body is configured to be adjusted via the opening of the first member.

9. A method for manufacturing a robot, wherein the robot comprises a first member that defines a first internal space accessible from an outside via an opening; a second member connected to the first member so as to be rotatable about a predetermined axis; a third member detachably attached to the second member to define a second internal space between the second member and the third member; and a wire body that is routed through a passage communicating between the first internal space and the second internal space at a position including the axis, the wire body being connected at one end thereof to a component fixed to the third member, the method comprising:

fixing an intermediate position of the wire body in a lengthwise direction to an inside of the third member;

after closing the second internal space by attaching the third member to the second member, in the first internal space accessed from the outside via the opening, adjusting a length of the wire body extending from a fixing position in the third member through the passage, to a length having slack required for relative rotation between the first member and the second member; and with the adjusted length, fixing an intermediate position of the wire body in the lengthwise direction to the first member.

* * * * *